United States Patent
Arnold et al.

(10) Patent No.: US 12,135,969 B2
(45) Date of Patent: Nov. 5, 2024

(54) ELECTROMAGNETIC COIL ASSEMBLY STRUCTURE FOR PROCESSING FLUIDS AND METHODS FOR MAKING SAME

(71) Applicant: DH TECHNOLOGIES DEVELOPMENT PTE. LTD., Singapore (SG)

(72) Inventors: Don W. Arnold, Livermore, CA (US); Thomas R. Covey, Richmond Hill (CA); Chang Liu, Richmond Hill (CA); Stanislaw Potyrala, Mississauga (CA); Alex Tsipirovich, North York (CA)

(73) Assignee: DH Technologies Development Pte. Ltd., Singapore (SG)

( * ) Notice: Subject to any disclaimer, the term of this patent is extended or adjusted under 35 U.S.C. 154(b) by 817 days.

(21) Appl. No.: 17/261,811

(22) PCT Filed: Jul. 19, 2019

(86) PCT No.: PCT/IB2019/056209
§ 371 (c)(1),
(2) Date: Jan. 20, 2021

(87) PCT Pub. No.: WO2020/016854
PCT Pub. Date: Jan. 23, 2020

(65) Prior Publication Data
US 2022/0011327 A1 Jan. 13, 2022

(51) Int. Cl.
*G06F 9/30* (2018.01)
*B03C 1/01* (2006.01)
(Continued)

(52) U.S. Cl.
CPC ............ *G06F 9/30036* (2013.01); *B03C 1/01* (2013.01); *B03C 1/288* (2013.01);
(Continued)

(58) Field of Classification Search
CPC ............ G06F 9/30036; G06F 9/30043; B03C 1/01; B03C 1/288; B03C 2201/15;
(Continued)

(56) References Cited

U.S. PATENT DOCUMENTS

| 8,361,316 B2 | 1/2013 | Siddiqi |
| 2011/0129931 A1 | 6/2011 | Reboud et al. |
| 2017/0074871 A1 | 3/2017 | Campbell et al. |

FOREIGN PATENT DOCUMENTS

| EP | 2105202 A1 | 9/2009 |
| WO | 2017093896 A1 | 6/2017 |

OTHER PUBLICATIONS

International Search Report and Written Opinion for PCT/IB2019/056209 mailed Dec. 23, 2019.

*Primary Examiner* — Jennifer Wecker
*Assistant Examiner* — Kathryn Elizabeth Limbaugh
(74) *Attorney, Agent, or Firm* — Potomac Law Group, PLLC; Reze Mollaaghababa; Ido Rabinovitch

(57) ABSTRACT

Electromagnetic systems and corresponding methods for assembling the electromagnetic systems are described. The electromagnetic systems can be used in fluid processing systems that include a plurality of fluid containers, each configured to define a fluid chamber that receives a fluid and a plurality of magnetic particles, and a plurality of electromagnets configured to generate a magnetic field within at least one of the plurality of the fluid containers. The fluid processing system can also include a PCB board that supplies the electromagnets with electrical current by establishing an electrical connection between electrical contact terminals included on the PCB board and spring loaded connections included on each electromagnet. A control component controls the electromagnetic field generated by each electromagnet to generate a plurality of magnetic field gradients within the at least one fluid container sufficient to
(Continued)

magnetically influence the plurality of magnetic particles within the fluid in each fluid container.

16 Claims, 11 Drawing Sheets

(51) Int. Cl.
  *B03C 1/28* (2006.01)
  *G01N 35/00* (2006.01)
(52) U.S. Cl.
  CPC ..... *G01N 35/0098* (2013.01); *G06F 9/30043* (2013.01); *B03C 2201/18* (2013.01); *B03C 2201/22* (2013.01); *B03C 2201/26* (2013.01); *G01N 2035/00534* (2013.01); *G01N 2035/00564* (2013.01)
(58) Field of Classification Search
  CPC ............ B03C 2201/22; B03C 2201/26; G01N 35/0098; G01N 2035/00534; G01N 2035/00564
  See application file for complete search history.

ELECTROMAGNETIC COIL ASSEMBLY STRUCTURE FOR PROCESSING FLUIDS AND METHODS FOR MAKING SAME

RELATED U.S. APPLICATIONS

This application claims the benefit of priority from U.S. Provisional Application No. 62/701,009, filed on Jul. 20, 2018, the entire contents of which is incorporated by reference herein.

FIELD

The present disclosure generally relate to electromagnetic structures and methods for assembling electromagnetic structures and, more particularly, electromagnetic structures and methods for assembling electromagnetic structures used to process fluids by manipulating magnetic particles disposed within the fluids.

INTRODUCTION

The preparation of samples is a critical phase of chemical and biological analytical studies. In order to achieve precise and reliable analyses, target compounds must be processed from complex, raw samples and delivered to analytical equipment. For example, proteomic studies generally focus on a single protein or a group of proteins. Accordingly, biological samples are processed to isolate a target protein from the other cellular material in the sample. Additional processing is often required, such as protein digestion, desalting, isolation, matrix cleanup (e.g., immunoprecipitation). Non-target substances such as salts, buffers, detergents, proteins, enzymes, and other compounds are typically found in chemical and biological samples. These non-target substances can interfere with an analysis, for example, by causing a reduction in the amount of target signal detected by analytical equipment. As such, complex, raw samples are typically subjected to one or more separation and/or extraction techniques to isolate compounds of interest from non-target substances.

Liquid chromatography (LC) is a typical solution-based technique for the separation of an analyte of interest present in a complex mixture of different substances. Liquid chromatography can generally involve running a liquid sample over a solid, insoluble matrix. The liquid sample can include an analyte of interest having an affinity for the matrix under certain conditions, for example, pH, salt concentration, or solvent composition conditions. During LC, the chemical components in a mixture can be carried through a stationary phase by the flow of a liquid mobile phase. Separation in liquid chromatography can occur due to differences in the interactions of the analytes with both the mobile and stationary phases.

High performance liquid chromatography (HPLC) is a form of LC, in which an analyte is forced through the stationary phase in a liquid mobile phase at high pressure. Forcing the analyte using high pressure can decrease the time the separated components remain on the stationary phase and, therefore, the time the components have to diffuse within the column. High performance liquid chromatography typically can result in processed samples that can be used by analytical equipment to achieve better resolution and sensitivity compared with conventional LC techniques. However, LC can be a complex technique that is costly to use for processing samples and is a serial process such that multiple, parallel columns are required to process a plurality of samples simultaneously. In addition, LC can irreversibly adsorb and/or co-elute certain potential target materials. Although HPLC can be faster than LC (e.g., typically requiring about 10-30 minutes to process a sample), the complexity and cost of HPLC can be much greater than conventional LC, for example, due to pumps and other specialized equipment required to carry out the process.

Magnetic particles or beads are another technology that can be employed for sample preparation for chemical and biological assays and diagnostics. Illustrative magnetic particles have been described in U.S. Pat. Nos. 4,582,622 and 4,628,037. Examples of devices and methods employing magnetic particles for sample separation and extraction are described in U.S. Pat. Nos. 4,554,088 and 8,361,316. Such magnetic particles are typically used in microfluidic systems, such as disclosed in an article entitled "Magnetic bead handling on-chip: new opportunities for analytical applications," authored by Martin A. M. Gijs and published in Microfluid Nanofluid (2004; I: 22-40).

Magnetic particle technology is a robust technology that provides for high performance (e.g., device sensitivity and accuracy) and also provides for easy automation of assay protocols. For many applications, the surface of magnetic particles is coated with a suitable ligand or receptor, such as antibodies, lectins, oligonucleotides, or other bioreactive molecules, which can selectively bind a target substance in a mixture with other substances. One key element in magnetic particle separation and handling technology can be efficient mixing to enhance the reaction rate between the target substances and the particle surfaces. Suspended magnetic particles can be actuated by magnetic forces, resulting in agitation of a sample solution to enhance or generate mixing processes. Example magnetic particle mixing systems have been disclosed in an article entitled "A chaotic mixer for magnetic bead-based micro cell sorter," authored by Suzuki et al. and published in the Journal of Microelectromechanical Systems (2004; I: 13:779-790) and an article entitled "A rapid magnetic particle driven micromixer," authored by Wang et al. and published in Microfluid Nanofluid (2008; I: 4:375-389).

Some previous techniques for mixing fluids using magnetic particles, such as disclosed in U.S. Pat. Nos. 6,231,760, 6,884,357, and 8,361,316, have involved moving a magnet relative to a stationary container or movement of the container relative to a stationary magnet using mechanical means to induce relative displacement of a magnetic field gradient within the container. The displacement of magnetic field gradients using such methods can cause some mixing within the container by inducing the magnetic particles to move continuously with the change of the magnet position. However, the formation of the magnetic field gradient within the container can attract and confine the particles in regions close to the walls of the container, which reduces mixing efficiency and effectiveness. Another technique described in International Patent Application Publication No. WO 1991/09308 involves the use of two electromagnets facing each other around a chamber having magnetic particles arranged therein. Sequentially energizing and de-energizing the two electromagnets (i.e., binary on/off control) at a sufficient frequency operates to suspend the magnetic particles within a fluid disposed in the chamber. The movement of particles resulting from actuating the two electromagnets according to this method can be limited to a small area within the chamber and generates relatively weak mixing forces. In addition, a portion of the magnetic particles may not be effected by the magnetic fields. The non-effected particles aggregate near chamber surfaces and do not contribute to mixing or affinity binding.

U.S. Pat. No. 8,585,279 discloses a microfluidic chip device that employs radio frequency (RF) driven electromagnets in combination with integrated pumps and fluidic channels to actuate magnetic particles within an enclosed sample container. The electromagnets are actuated in a sequence configured to vary a magnetic field gradient within the sample container to effectuate the movement of the magnetic particles within a sample fluid. However, the mixing of samples using the microfluidic chip device is inherently serial in nature as the configuration of the microfluidic device only allows for the processing of a limited number of samples simultaneously. Due to the particular configuration, the microfluidic chip device experiences relatively large sample volume loss and magnetic particle loss. In addition, the enclosed channels and sample container of the microfluidic chip microfluidic device introduces a barrier to automation of the loading and collection of sample volumes from the device and limits the sample volumes capable of being processed. Samples processed using the microfluidic chip device are necessarily exposed to a large contact surface area as they are required to travel through the various channels and fluidic paths of the device. Accordingly, samples processed via the microfluidic chip device are susceptible to high carry-over and low recoveries, for example, due to non-specific binding.

Magnetic particles have also been used in sample plate applications, such as the SISCAPA technique described in an article entitled "Mass spectrometric quantitation of peptides and proteins using Stable Isotope Standards and Capture by Anti-Peptide Antibodies (SISCAPA)," authored by Anderson et al. and published in the Journal of Proteome Research (2004; I: 3:235-244). Example magnetic sample plate systems include the Agencourt SPRIPlate 96R—Ring Super Magnet Plate provided by Beckman Coulter, Inc. of Brea, California, United States and the Magnum FLX provided by Alpaqua® of Beverly, Massachusettes, United States. In these applications, the sample plates include a plurality of fixed-field magnets arranged such that the magnets either protrude between the sample wells or allow the sample wells to be positioned within ring-shaped magnets. Magnetic particles within the sample wells can be agitated by placing a permanent magnet near the sample plate to promote mixing. Other types of automated mixing devices generally attempt to achieve mixing by mechanical agitation (i.e., by shaking the sample plate). After processing the samples, the magnets can be used to confine the beads to the side of the sample wells to allow for the removal of the sample fluid. However, the fixed-field magnets used in conventional magnetic sample plate applications are not capable of achieving robust mixing. For example, the magnetic particles generally tend to aggregate and cluster in discrete areas of the sample wells. In addition, the plate itself must be moved between steps of the analysis, which requires significant automation.

Accordingly, a need exists to improve the overall speed and efficiency of sample mixing and separation using magnetic particles, including ultra-fast homogenous mixing of sample fluids and the accessible, parallel processing of a large number of sample fluids.

SUMMARY

Apparatus, systems, and methods in accordance with various aspects of the applicant's present teachings allow for the processing of fluids using electromagnetic structures without the limitations on sample volume, sample loss, and magnetic particle loss experienced with known systems. By way of example, fluids can be processed within an open fluid container (e.g., open to the ambient atmosphere, without a top cover) using magnetic particles disposed within the fluids. The magnetic particles can be configured to be agitated by a magnetic field generated by magnetic structures arranged adjacent to the fluid containers, for example, arranged in a two-dimensional array about the periphery of the fluid container.

Based on the selective application of signals to the magnetic structures surrounding the fluid container, the magnetic particles can be influenced to rotate, spin, and/or move laterally side-to-side within the fluid so as to rapidly and efficiently mix the fluid and/or capture target analytes within the fluid, by way of non-limiting example. The magnetic structures can be formed from a plurality of electromagnets disposed around the fluid container, with each electromagnet being individually controlled to generate a desired magnetic field within the fluid container effective to influence the magnetic particles disposed therein.

In accordance with various aspects of the present teachings, the system does not utilize integrated microfluidic delivery of the sample to the mixing chamber within the container such that the methods and systems disclosed herein can enable the processing of a variety of different volumes of samples therewithin. Whereas micro-fluidic based systems generally are closed systems that rely on diffusion, capillary forces, or microfluidic pumps to transport a fixed quantity of liquid through fully-filled microfluidic networks, systems and methods in accordance with various aspects of the present teachings can utilize containers that can be filled or partially-filled with various volumes of the fluid sample, thereby allowing for the reduction or expansion of the sample volume to be processed, depending for example on the availability or expense of the sample and/or on the requirements of a particular assay.

In some aspects, samples to be processed (and the reagents utilized to process the same) can be directly added to the open fluid container (e.g., via an auto-sampler or pipette inserted through the open end of the container) and can likewise be directly removed therefrom (e.g., via a capture device) following the processing, for example.

In one aspect, a fluid processing system is described. The fluid processing system can include a plurality of fluid containers, a plurality of electromagnets, a PCB board, and a control component coupled to the plurality of electromagnets. Each fluid container can be configured to define a fluid chamber configured to contain a fluid and a plurality of magnetic particles therein. The fluid chamber can be configured to extend from a closed lower end to an open upper end that is open to atmosphere and also configured to receive the fluid for processing using the fluid processing system. Each electromagnet can be configured to generate a magnetic field within at least one of the plurality of the fluid containers. Further, each electromagnet can comprise a plurality of spring loaded connections. The PCB board can comprise a plurality of electrical contact terminals. Each electrical contact terminal can be configured to receive an electrical signal from an electrical power source. Each electrical contact terminal can further be configured to connect to a spring loaded connection of a corresponding electromagnet and establish an electrical connection with the corresponding electromagnet that supplies the electromagnet with the electrical signal. The control component can be coupled to the plurality of electromagnets. The control component can be configured to control the electromagnetic field generated by each electromagnet to generate a plurality of magnetic field gradients within the at least one fluid container sufficient to magnetically influence the plurality of magnetic particles within the fluid in each fluid container.

In another aspect, a method for fluid processing is described. The fluid processing method can comprise delivering a fluid and a plurality of magnetic particles to a plurality of fluid containers, supplying an electrical signal, directed from an electrical power source to a PCB board, through a plurality of electrical contact terminals included in the PCB board, to a plurality of electromagnets by establishing an electrical connection between spring loaded connections included on each electromagnet and the electrical contact terminals of the PCB board, generating a magnetic field within at least one of the plurality of the fluid containers using the plurality of electromagnets, and controlling the electromagnetic field generated by each electromagnet to generate a plurality of magnetic field gradients within the at least one fluid container sufficient to magnetically influence the plurality of magnetic particles within the fluid in each fluid container.

In other examples, any of the aspects above, or any system, method, apparatus described herein can include one or more of the following features.

The PCB board can include a plurality of holes. Each hole can be configured to receive at least a portion of an electromagnet. The holes can be configured such that at least two electrical contact terminals are disposed adjacent to a circumference of each hole. Further, each electromagnet can include a mounting post that is configured for insertion into a corresponding hole. Additionally or alternatively, the electrical contact terminals of the PCB board can comprise electrical wires that are connected to the PCB board.

At least one electromagnet can comprise one or more magnetic lenses that are configured to reshape the electromagnetic field generated by the electromagnet. Further, the spring loaded connections included in each electromagnet can comprise at least one spring loaded push pin. Additionally or alternatively, each electromagnet can comprise a coiled conductive wire. The spring loaded connections of each electromagnet can be configured such that they are electrically coupled to the coiled conductive wire of that electromagnet.

Further, at least one fluid container can comprise a plurality of sample wells arranged within a sample plate. In some aspects, the sample plate can comprise a 96-well sample plate.

Other aspects and advantages of the invention can become apparent from the following drawings and description, all of which illustrate the various aspects of the invention, by way of example only.

BRIEF DESCRIPTION OF THE DRAWINGS

A detailed description of various embodiments is provided herein below with reference, by way of example, to the following drawings. It will be understood that the drawings are exemplary only and that all reference to the drawings is made for the purpose of illustration only, and is not intended to limit the scope of the embodiments described herein below in any way. For convenience, reference numerals may also be repeated (with or without an offset) throughout the figures to indicate analogous components or features.

DETAILED DESCRIPTION

The present disclosure generally relates to an electromagnetic system and a corresponding method for assembling the electromagnetic system. In some embodiments, the electromagnetic system can be used for mixing, separating, filtering, or otherwise processing a fluid sample by utilizing magnetic particles dispersed therein. The fluid processing systems can be configured to process fluids at the macro- or micro-scale. In general, the macro-scale can involve fluid volumes in the milliliter range, while micro-scale fluid processing can involve fluid volumes below the milliliter range, such as microliters, picoliters, or nanoliters. However, fluid processing systems can process any fluid volume capable of operating as described herein.

Figure 1A:
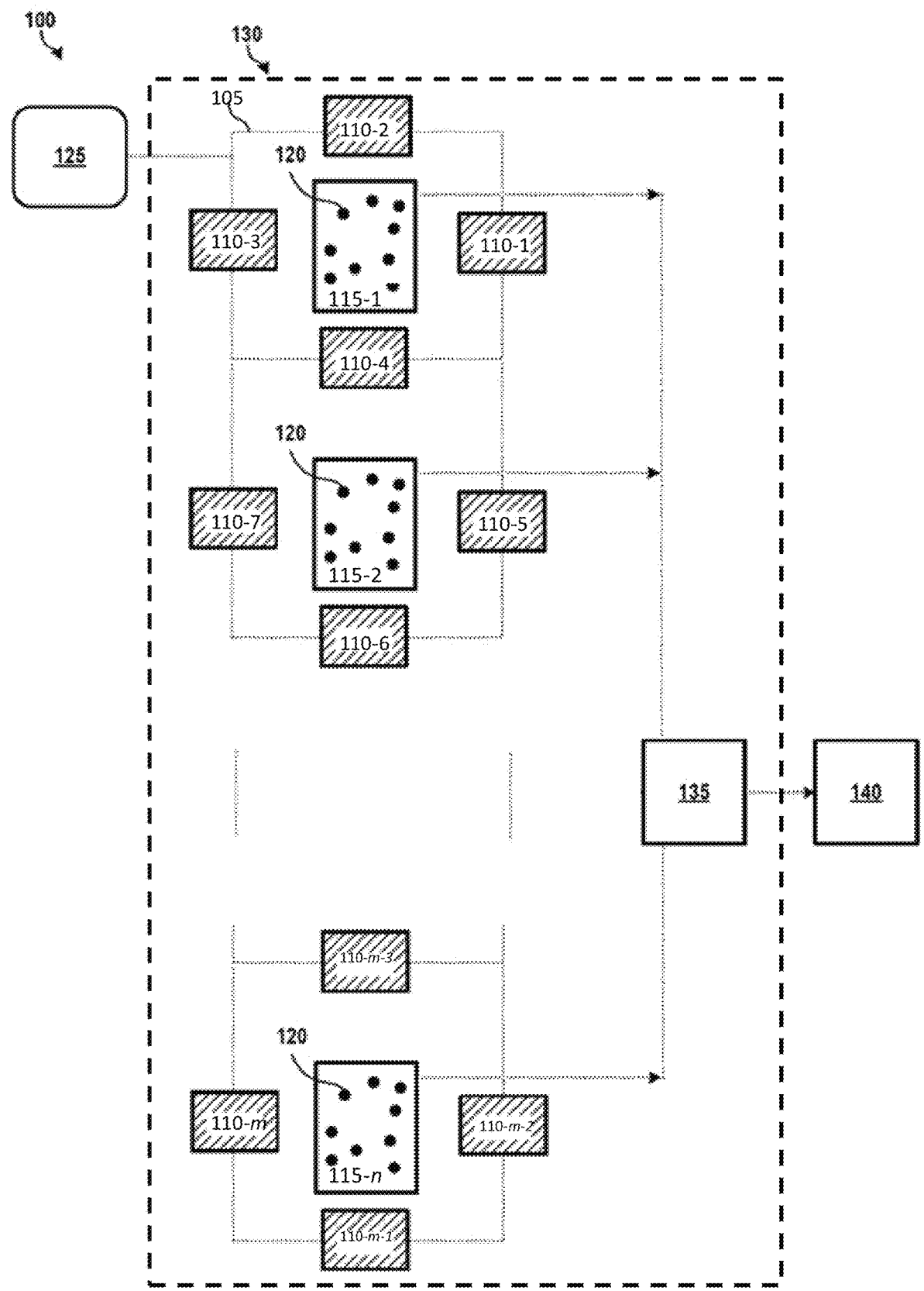
FIGS. 1A-1D depict an illustrative fluid processing system according to some aspects disclosed herein.

FIGS. 1A-1D depict an illustrative fluid processing system 100 according to some aspects disclosed herein. The fluid processing system 100 shown in FIG. 1A is being provided as an example, and the systems, devices, and methods described herein can be used in conjunction with many different fluid processing systems. Further, the fluid processing system 100 represents only one possible fluid processing system for use in accordance with embodiments of the systems, devices, and methods described herein, and fluid processing systems and/or components thereof having other configurations and operational characteristics can all be used in accordance with the systems, devices, and methods described herein as well.

The fluid processing system 100 can include a fluid processing structure 130 having a plurality of fluid containers 115-1, 115-2, . . . , 115-n and a magnetic structures 105 that is configured to generate a magnetic field gradient or magnetic force within the fluid containers 115-1, 115-2, . . . , 115-n. Each fluid container 115-1, 115-2, . . . , 115-n can generally comprise any type/number of containers. The container(s) can be configured to hold a sample fluid. The containers can be any suitable container that defines a fluid-containing chamber therein, such as a sample well, a vial, a fluid reservoir, wells in the microtiter plate, or the like. Generally, any suitable number of fluid containers 115-1, 115-2, . . . , 115-n can be used.

Generally, each fluid container 115-1, 115-2, . . . , 115-n can contain a fluid sample. Further, each fluid container 115-1, 115-2, . . . , 115-n can be an open sample container (e.g., open to the atmosphere), which allows for insertion and/or removal of the fluid sample(s) and/or reagents to/from the sample container. For example, the fluid sample container 115-1, 115-2 . . . , 115-n can be arranged such that it allows for direct insertion of a fluid sample via an auto-sampler or pipette inserted through the open end of the container and/or direct removal of the sample via a capture device, once the fluid is processed. The fluid containers 115-1, 115-2, . . . , 115-n can comprise various structures. For example, the fluid containers 115-1, 115-2, . . . , 115-n can be a multi-vial array structures that include a plurality of wells or vials, which are configured to allow for high-throughput sample preparation.

The fluid sample in each fluid container 115-1, 115-2, ..., 115-$n$ can comprise a plurality of magnetic particles 120 disposed therein. The magnetic particles can be added to the sample fluid prior to transferring the sample fluid to each fluid container 115-1, 115-2, ..., 115-$n$, before, and/or after the sample fluid has been transferred thereto.

The magnetic particles 120 can be configured such that they can be agitated under the effect of a magnetic field. As described in further details below, the magnetic field can be generated using the magnetic structure 105. For example, the magnetic field can be generated using one or more electromagnets arranged adjacent to the fluid containers 115-1, 115-2, ..., 115-$n$. The magnetic particles 120 or portions thereof can be formed from various magnetically susceptible materials, including, without limitation, ferromagnetic materials, such as various iron oxide materials (e.g., $Fe_2O_3$, $SiO_2$ coated $Fe_2O_3$, $Fe_3O_4$, or the like).

In some embodiments, the magnetic particles 120 can include a magnetic "core," coated with a non-magnetic coating. For example, the magnetic particles 120 can be configured such that they do not react with the fluids and/or such that they selectively bind to a material (e.g., a biomaterial) of interest. In some embodiments, at least a portion of the magnetic particles 120 can include paramagnetic beads. In some implementations, when using paramagnetic beads, at least a portion of the magnetic particles 120 can include ferromagnetic magnetic particles that agitate the magnetic particles 120 in the fluid and/or facilitate the movement of the magnetic particles 120 within the system.

Additionally or alternatively, the magnetic particles can include beads modified with various alkyl groups, such as C18 alkyl groups ("C18 beads"). By way of non-limiting example, such C18 beads can be used for the purification, desalting, and concentration of peptides and protein digests. Further, the magnetic particles can comprise beads that have been functionalized, for example, by being coated with antibodies ("affinity beads") to provide for selective binding of particular analytes within the sample. The magnetic particles 120 can have various shapes, such as spherical and/or rod-shaped (i.e., magnetic stir bars), such as described in International Patent Application Publication No. WO 2015/128725, the entire teachings of which is incorporated by reference herein.

The magnetic structure 105 can be formed using a plurality of electromagnets 110-1, 110-2, ..., 110-$m$ disposed around the fluid containers 115-1, 115-2, ..., 115-$n$. Each electromagnet 110-1, 110-2, ..., 110-$m$ in the magnetic structure 105 can be individually controlled to generate a desired magnetic field within the fluid container effective to influence the magnetic particles disposed therein. For example, the magnetic structure 105 can be configured such that the combined effect of the plurality of electromagnets 110-1, 110-2, ..., 110-$m$ produces a magnetic field within a sample container with different characteristics, such as different strengths and/or directionality, in order to rapidly and efficiently mix the fluid and/or capture target analytes within the fluid.

The magnetic structure 105 can be arranged in various configurations. For example, the magnetic structure 105 can be arranged in a two-dimensional array. Alternatively or additionally, the magnetic structure 105 can be arranged as multiple layers of two dimensional arrays, which can enable three-dimensional movements of the magnetic particles. The magnetic structure 105 can be disposed about the periphery of the fluid container, in order to facilitate the movement of the magnetic particles within the fluid sample. Further, the magnetic structure 105 can be configured such that selective application of electrical signals to the magnetic structures (e.g., electromagnets surrounding the fluid container) causes the magnetic particles in the fluid sample to rotate, spin, and/or move laterally within the fluid sample.

The use of magnetic structures to influence magnetic particles described herein can provide various technological advantages over the existing technology, such as conventional magnetic particle processing systems. For example, the magnetic structures disclosed herein can significantly improve the rates of diffusion for increased sample contact rate in various volumes of the sample fluid and/or improve analyte capture efficiency in a magnetic immunoassay. Further, the magnetic structures disclosed herein can influence the magnetic particles to provide for faster and more effective sample mixing, and as such provide an increase in the sample mixing efficiency. Additionally, processing samples using the fluid processing structures configured according to present teachings can generates fast reaction kinetic. For example, protein processing, including immunological affinity pull-down, washing, elution/denaturation, reduction, alkylation, and digestion procedures, can be completed in about 10-12 minutes, compared with a one- or two-day processing time for manual, in-tube processing. The increased processing speed is achieved, for example, due to overcoming diffusion as a rate-limiting step of fluid processing (e.g., a rate-limiting step of LC) and the necessity of utilizing small, fixed volumes in known microfluidic platforms. In addition, such fast, efficient sample processing can be achieved across a large array of sample reaction containers simultaneously as the fluid processing structures configured according to the present teachings can be integrated into large arrays of sample reaction wells, thereby increasing sample processing and enabling automation via an autosampler, for example. The fluid processing systems described herein can also provide multiple other technological advantages in addition to the aforementioned non-limiting examples.

As noted, the magnetic structure 105 further include a plurality of electromagnets 110-1, 110-2, ..., 110-$m$. Although four electromagnets (e.g., electromagnets 110-1, 110-2, 110-3, 110-4) are depicted in FIG. 1A as surrounding each fluid container (e.g., fluid container 115-1), embodiments disclosed herein are not limited to any specific number of electromagnets. Generally, any suitable number of electromagnets (e.g., 2, 3, 4, 5, 6, 7, 8, 9, 10, or more electromagnets) can be used to generate a magnetic field gradient or magnetic force within each fluid container 115-1, 115-2, ..., 115-$n$.

In some embodiments, the four electromagnets (e.g., electromagnets 110-1, 110-2, 110-3, 110-4) can be configured to operate the same as or substantially similar to a quadrupole magnet structure. The electromagnets 110-1, 110-2, ..., 110-$m$ can include any suitable electromagnet known in the art, including, for example, a ferromagnetic-core electromagnet. Further, the electromagnets 110-1, 110-2, ..., 110-$m$ can have various shapes, including square, rectangular, round, elliptical, or any other shape capable of operating according to various aspects disclosed herein.

The fluid processing system 100 can also include a controller 125. The controller 125 can be configured to differentially actuate the electromagnets via the application of one or more radio frequency (RF) signals, direct current (DC) signals, alternating current (AC) signals, or the like. Additionally or alternatively, the AC signals applied to the plurality of electromagnets can exhibit different phase delays relative to one another in order to effect the desired movement of the electromagnets within the sample fluid. Further, the DC signals can be effective to isolate the electromagnets (e.g., draw magnetic particles to one side of the fluid container) such that fluid can be withdrawn from the container without aspiration of the magnetic particles, by way of non-limiting example.

The controller 125 can be operatively coupled to the magnetic structure 105 and configured to control the magnetic fields produced by the electromagnets 110-1, 110-2, ..., 110-m. In some embodiments, the controller 125 can be configured to control one or more power sources (not shown) configured to supply an electrical signal to the plurality of electromagnets 110-1, 110-2, ..., 110-m. The electrical signal can be in the form of radio frequency (RF) waveforms, direct current (DC), alternating current (AC), or the like. Although AC waveforms are generally used herein as an example of waveforms, which can be applied to the electromagnets 110-1, 110-2, ..., 110-m to promote mixing of the fluid sample, any suitable type of electrical current capable of operating according to various aspects of the present teachings are contemplated herein.

For example, a DC signal can, additionally or alternatively, be applied to the one or more electromagnets 110-1, 110-2, ..., 110-m in order to draw the magnetic particles 120 to one side of a fluid container 115-1 (and out of the bulk fluid) and aid in fluid transfer from the container after the mixing step and/or prevent the aspiration of the magnetic particles.

The controller 125 can be any type of suitable device and/or electrical component capable of actuating an electromagnet. The controller 125 can operate to regulate the magnetic field produced by each of the electromagnets 110-1, 110-2, ..., 110-m by controlling the electrical current passing through a solenoid of each of the electromagnets. Additionally or alternatively, the controller 125 can include or be coupled to a logic device (not shown) and/or a memory, such as a computing device that executes an application configured to provide instructions for controlling the electromagnets 110-1, 110-2, ..., 110-m. The application can provide instructions based on operator input and/or feedback from the fluid processing system 100. For example, the application can include and/or the memory can be configured to store one or more sample processing protocols for execution by the controller 125.

Each electromagnet 110-1, 110-2, ..., 110-m can be individually addressed and actuated by the controller 125. For example, the controller 125 can supply AC electrical signals of different phases to each of the one or more of the electromagnets 110-1, 110-2, ..., 110-m, such that one or more of the electromagnets generate a different magnetic field. In this manner, the magnetic field gradient generated by the magnetic structure 105 within the fluid containers 115-1, 115-2, ..., 115-n can be rapidly and effectively controlled to manipulate the movement of magnetic particles 120 within the sample fluid. In some embodiments, the RF waveforms and the characteristics thereof (e.g., phase shifts) can be applied to the electromagnets 110-1, 110-2, ..., 110-m according to the sample processing protocol. It will be appreciated in light of the present teachings that the magnetic structures 105 can be utilized to manipulate the magnetic particles 120 within the sample fluid in various processes including, without limitation, protein assays, sample derivatization (e.g., steroid derivatization, sample derivatization for gas chromatography, etc.), and/or sample purification and desalting. Following this processing, processed fluid can be delivered to various analytical equipment, such as a mass spectrometer (MS) for analysis.

Figure 1B:
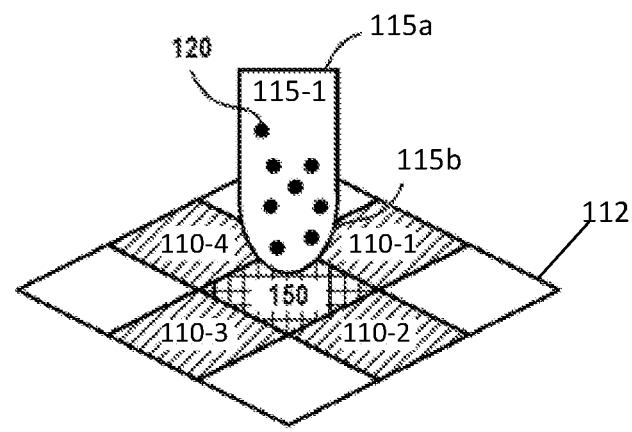

FIG. 1B illustrates an example of a fluid container 115-1. As shown in FIG. 1B, the fluid container 115-1 can extend from an open, upper end 115a (e.g., open to the ambient atmosphere) to a lower, closed end 115b. Under such arrangement, fluid can be loaded into and/or removed from the fluid container 115-1 through the open upper end 115a of the fluid container 115-1. For example, as shown in FIG. 1B, one or more liquid loading/collection devices 135 can be inserted into the open upper end 115a of the fluid container 115-1 and be used to load and/or remove liquid into or out of the fluid container 115-1. The container 115-1 can include a removable cap (not shown). The cap can be arranged in any suitable manner. For example, the cap can be coupled to the open, upper end 115a (e.g., an Eppendorf tube) during various processing procedures. For example, the cap can be used to prevent the escape of fluid during mixing, contamination, and/or evaporation. Examples of liquid loading/collection devices 135 that can be used with embodiments disclosed herein can include, without limitation, manual sample loading devices (e.g., pipette), multi-channel pipette devices, acoustic liquid handling devices, and/or an autosampler. Liquid can be transported to an analytical device 140 for further processing or analysis (e.g. mass spectrometer).

In some embodiments, a single layer of electromagnets 110-1, 110-2, ..., 110-m (e.g., arranged at a height above the bottom 115b of the fluid chamber and about the periphery of the fluid containers) can be actuated to generate a magnetic field within the fluid containers 115-1, 115-2, ..., 115-n that captures and/or suspends the magnetic particles 120 in a particular plane within the fluid containers. For example, the magnetic particles 120 can be suspended in a particular plane to move the magnetic particles away from the bottom of the fluid containers during a fluid collection process and/or for processing fluids (e.g., reagents) in a plane above material (e.g., cells adhering to the lower surface of the fluid chamber), where contact with the material on the lower surface of the fluid chamber is to be avoided.

The magnetic structures 105 can be incorporated into various fluid processing systems and fluid handling devices. For example, as shown in FIG. 1B, the magnetic structure 105 can operate as a standalone mixing device 112 that functions as the mixing element of a magnetic mixer.

Further, as shown in FIG. 1B, in some embodiments an actuator 150 can be utilized to initiate the controller 125. Specifically, the fluid container 115 can be pressed against an actuator 150 to initiate the controller 125 to actuate the electromagnets 110-1, 110-2, 110-3, 110-4. Further, the magnetic structure 105 (FIG. 1A) can be used for mixing magnetic particles 120 within the sample containers of a sample plate, such as a conventional 4, 8, 12, or 96 well sample plate. Additionally or alternatively, the magnetic structure 105 can be configured to mix magnetic particles 120 within the sample wells of open-well sample plate (i.e., open-to-atmosphere, sealed with a removable covering or cap, and/or partially enclosed).

Figure 1C:
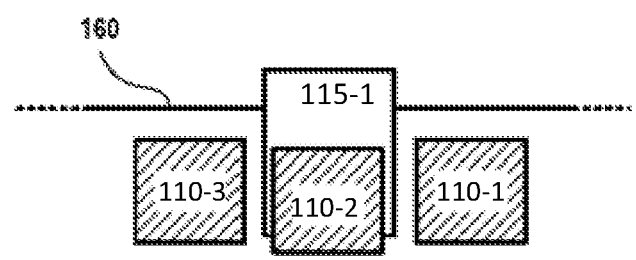
Figure 1D:
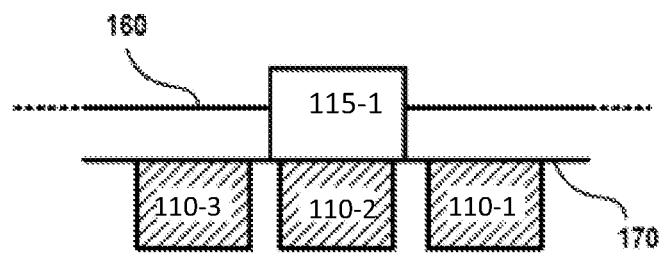

As shown in FIG. 1C, the fluid container 115-1 (i.e., sample well) of a sample plate 160 can fit down within a cavity formed between the electromagnets 110-1, 110-2, ..., 110-m. Further, as shown in FIG. 1D, a sample plate 160 can be placed on a portion of the fluid processing system 100, such as on a planar surface 170 thereof, such that the sample well 115-1 can be arranged adjacent to the electromagnets 110-1, 110-2, ..., 110-m.

Figure 2A:
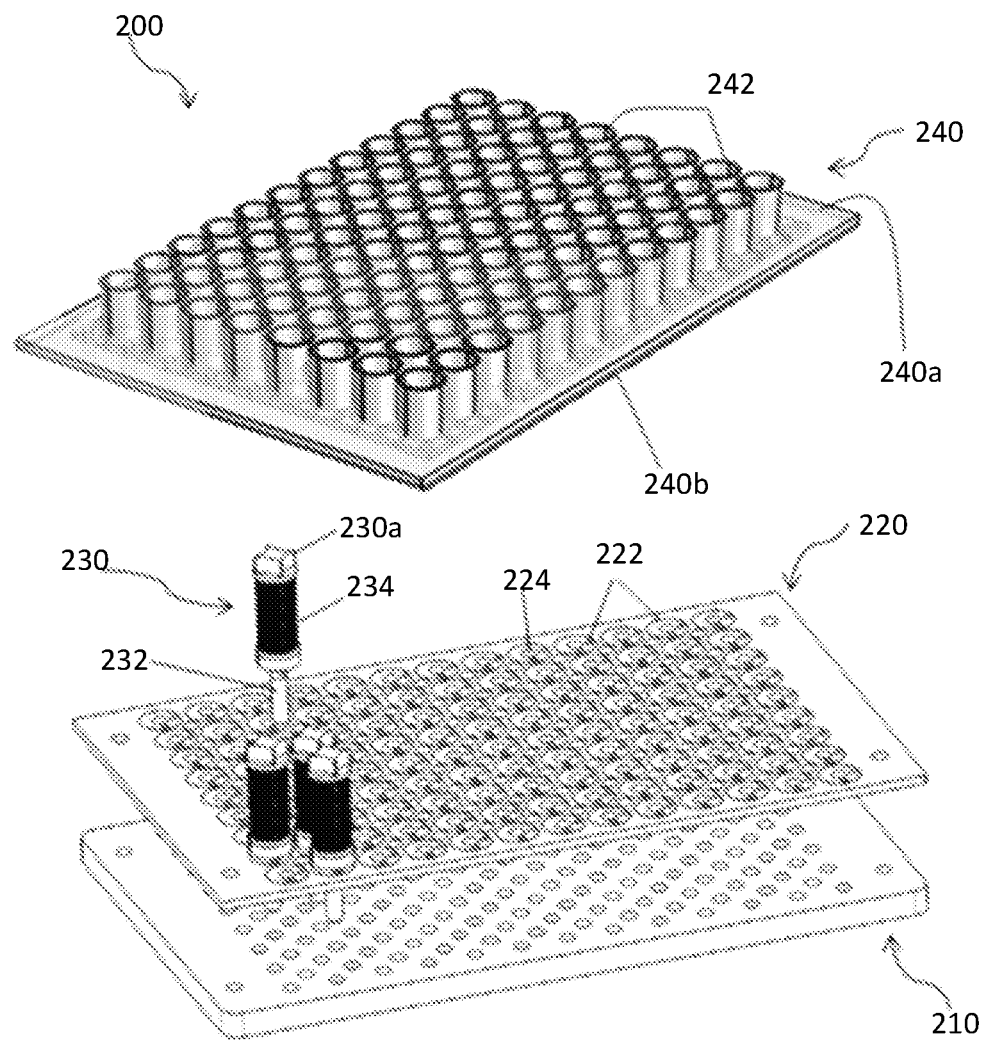
FIGS. 2A-B depict an example of a fluid processing system according to some aspects disclosed herein.
Figure 2B:
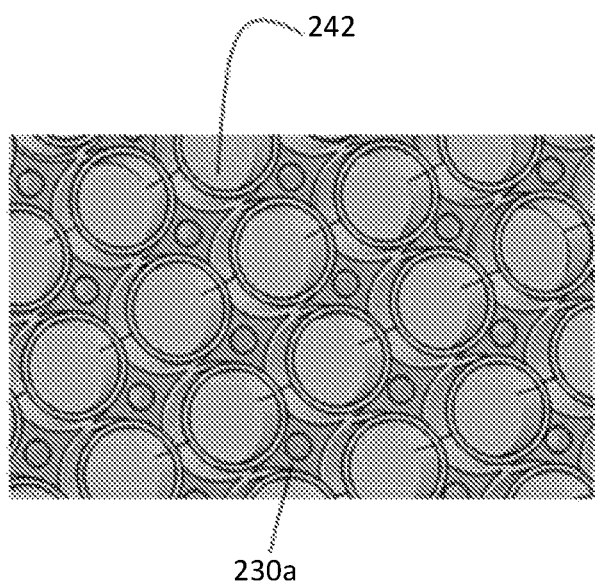

Referring to FIGS. 2A-B, an example of a fluid processing system 200 in accordance with various aspects of the present teachings is depicted. As shown in FIG. 2A, the fluid processing system 200, depicted in exploded view, can comprise a base plate 210, a PCB board 220, a plurality of electromagnetic structures 230, and an upper plate 240 defining a plurality of sample wells 242 extending from a substantially planar upper surface 240a thereof. It will be appreciated by a person skilled in the art that though the upper plate 240 is depicted in FIG. 2A as a 96-well format in which the sample wells have a substantially circular cross-sectional shape, the upper plate 240 can include any number of sample wells 242 exhibiting a variety of cross-sectional shapes and maximum volumes as discussed above. For example, in accordance with the present teachings, each of the open sample wells 242 can be filled or partially-filled with various volumes of the fluid sample, thereby allowing for the reduction or expansion of the sample volume to be processed, depending for example on the availability or expense of the sample and/or on the requirements of a particular assay. It will further be appreciated that the upper plate 240 can be manufactured using any suitable material known in the art or hereafter developed in accordance with the present teachings such as a polymeric material (e.g., polystyrene or polypropylene), all by way of non-limiting example. Additionally, as known in the art, the surfaces can be coated with a variety of surface coatings to provide increased hydrophilicity, hydrophobicity, passivation, or increased binding to cells or other analytes. In some aspects, the bottom surface 240b of the upper plate 240 can be configured to engage (permanently or removably) with the lower portions of the fluid processing system, as discussed below. For example, as shown in FIG. 2B, in some aspects, the bottom surface 240b can include depressions formed therein for engaging the upper end 230a of the electromagnetic structures 230 or bores through which a portion of the electromagnetic structures can extend to be disposed around and about each of the sample wells 242.

The fluid processing system 200 can further include a PCB board 220, a base plate 210, and a plurality of electromagnets 230. As shown, the PCB board 220 can comprise a plurality of electrical contacts 222, to which an electrical signal can be applied by a power source (not shown), and to which the electromagnet 230 can be electrically coupled. As otherwise discussed herein, the PCB board 220 can be configured such that each electromagnet 230 can be individually addressed and actuated by a controller through the selective application of electrical signals thereto.

Additionally, the PCB board 220 can include a plurality of holes 224, through which a portion of the electromagnetic structures can extend to the base plate 210. The base plate 210 is configured to mount the electromagnets 230. The base plate 210 can also function as a heat sink. For example, as shown in FIG. 2A, the electromagnets 230 can include a mounting post 232, which extends through the holes 224 when the electromagnets 230 are seated on the electrical contacts 222. The mounting post 232 can be configured such that conductive leads associated with the mounting posts 232 can be electrically coupled to the base plate 210. As shown, the base plate 210 can include bores corresponding to the mounting posts 232 so as to ensure that the mounting posts 232 are in secure engagement therewith. Further, the electromagnet 230 can include an upper post, around which can be a coiled conductive wire 234 that is electrically coupled to the electrical contacts 222 of the PCB board. The conductive wire 234 can terminate in a coil holder 255 in an upper end 230a of the electromagnet 230. The coil holder 255 can comprise a non-conductive material.

Figure 2C:
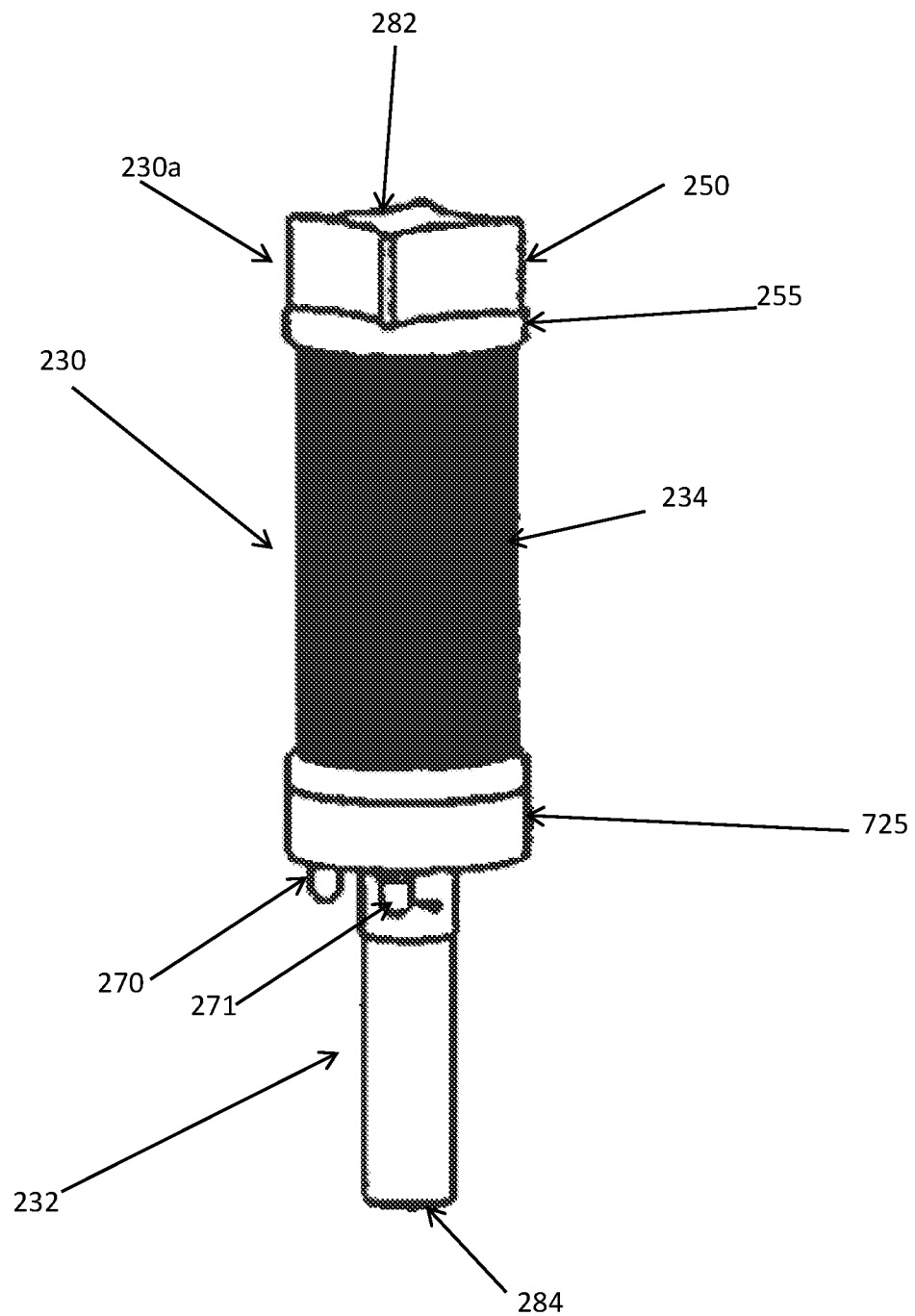
FIGS. 2C-2F depict examples of an electromagnet and connections for connecting the electromagnet according to some aspects disclosed herein.
Figure 2D:
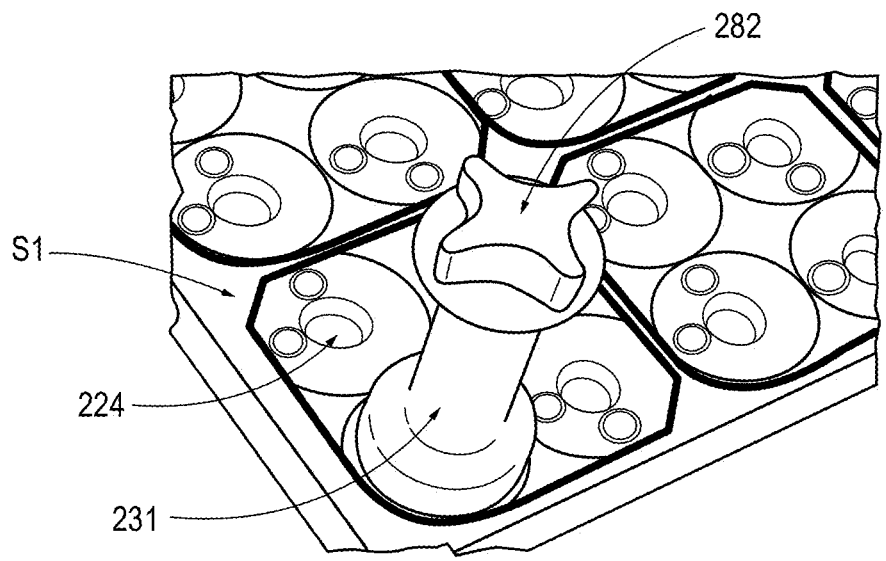
Figure 2E:
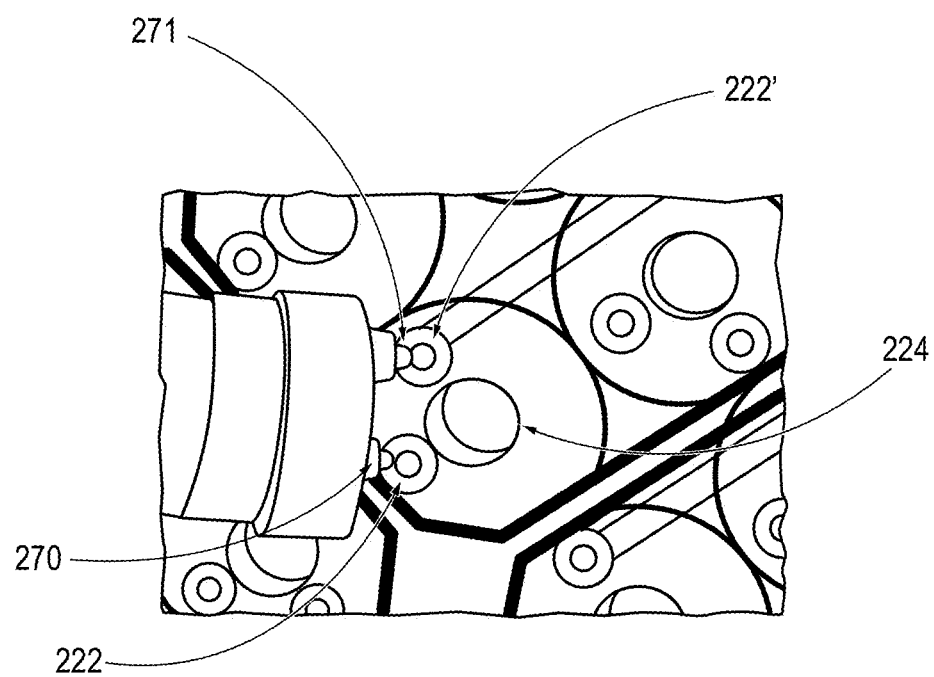

FIGS. 2C-2E illustrate an example of an electromagnet 230 according to some aspects of the present teachings. As shown, the electromagnet 230 can include an upper pole 282, disposed at an upper end 230a of the electromagnet 230, and a lower pole 284. In some aspects, a non-conductive material 725 can surround at least a portion of the exterior part of the electromagnet 230. For example, as shown in FIG. 2D, an insulating material 231 can be used to insulate the electromagnet 230. Generally, any suitable non-conductive material available in the art can be used to insulate the electromagnet 230.

The upper pole 282 of the electromagnet 230 can comprise an electrically conductive material. In some aspect, the upper pole 282 and the lower pole 284 can comprise a single piece that is electrically isolated using the insulating material 231. The electromagnet 230 can also include one or more magnetic lenses 250. The magnetic lenses 250 can be configured to reshape the magnetic field in the sample wells 242 (containers) adjacent to the electromagnet 230.

Referring back to FIG. 2A, the base plate 210 can be grounded to form a complete electrical circuit(s). The PCB board 220 can be configured such that one or more electrical signals can be applied to the plurality of electrical contacts 222 and cause an electrical current to flow from the contacts 222 through the electromagnetic structures 230.

Figure 2F:
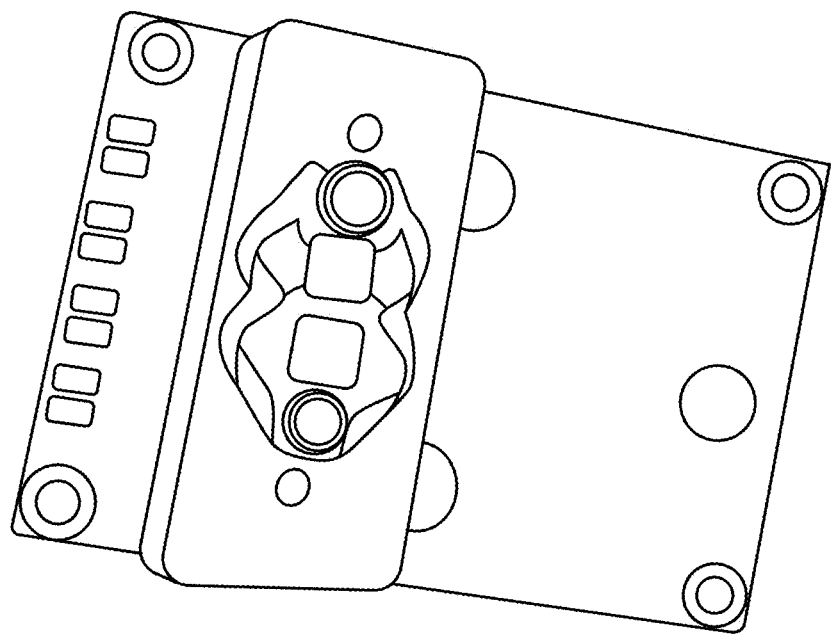

As shown in FIGS. 2D-2F, the connection between the PCB board and each electromagnet 230 can be achieved using a plurality of conductive spring loaded push pins 270, 271. Although described and shown as two spring loaded push pins, any suitable structure and any suitable number of structures capable of connecting the electromagnet 230 to the PCB board can be utilized in accordance with the present teachings. The spring loaded push pins 270, 271 connect to the conductive wire 234, and can be configured to conduct the electric signals from the PCB control board to the conductive wire 234.

Specifically, current can flow from the electrical contacts of the PCB board 222, through the spring loaded push pins 270, 271 and the wire coil 234. The direction of the current can depend on the voltage of the signal applied to the particular contacts 222. The wire coil 234 can act as a solenoid to generate a magnetic field through and about the wire coil 234, the directionality of which is dependent on the direction of the current. The upper end 230a of the electromagnetic structures 230 can have a variety of shapes (e.g., substantially the same cross-section shape as the post around which the wire is coiled). For example, the upper end 230a can be preferentially formed from a conductive material and shaped to correspond to the peripheral surfaces of the sample wells, so as to act as a lens that concentrates the magnetic field and/or increases its uniformity within the sample wells.

The spring loaded push pins 270, 271 can be configured such that they can connect with corresponding contact areas 222 on the PCB board. For example, as shown in FIG. 2E, the spring loaded push pins 270, 271 are configured to connect with corresponding contacts 222, 222' on the PCB board. As noted, the corresponding contacts 222, 222' on the PCB board can be electrical contacts on the PCB board that have been configured to receive and connect to the spring loaded push pins 270, 271, in order to establish an electrical connection that forwards the electrical signals from the PCB control board to the conductive wire 234 of the electromagnet 230.

For example, in some aspects, the corresponding contacts 222, 222' can be small holes formed on the PCB board that are configured to serve as connection points for the spring loaded push pins 270, 271. Further, in multi-well processing system, the electric signal is generally sent to the electromagnets simultaneously, controlled by a single PCB board (e.g., PCB board 220 shown in FIG. 2A). For example, in order to generate the electric signals required for a 96-well sample tray, such as the sample tray in shown in fluid system 200 of FIG. 2A, at least 117 electromagnetic structures 230 need to be actuated independently and simultaneously. An electromagnet and PCB board configured according to the present teachings, by establishing the connection between the electromagnet 230 and the PCB board using the spring loaded push pins 270, 271, allow for more stable and robust electric signal control and provide more convenient electromagnetic structure replacement and more convenient electromagnetic structure and pin assembly.

Referring back to FIG. 2E, each hole 224 in the PCB board can comprise a plurality of contact areas 222, 222' disposed adjacent to or around the circumference of the hole 224. The contact areas 222, 222' can be configured such that they can connect to respective terminals of a voltage source (e.g., an AC or DC voltage source) and/or a controller for delivery of voltage to thereto. In some aspects, the PCB board can comprise a plurality of sub-regions Si, each comprising a series of wells (e.g., four or sixteen holes). The wells or holes can be equidistantly spaced from one another such that they define a generally square-shaped configuration. Further, the spring loaded push pins 270, 271 of each electromagnet 230 can be configured such that they can establish a contact with respective connections 222, 222' on the PCB board.

As shown in FIG. 2F, in some aspects, the connection between the PCB board and the electromagnet 230 can be established by welding or soldering the connections onto the PCB board. Alternatively or additionally, wire terminals can be used to form and establish the connections.

The AC current forwarded by the PCB board to the magnetic electromagnet 230 can comprise a frequency range of about 300 Hz. At this frequency range, the probability of cross talk between the elements in the PCB board is reduced (e.g., copper traces or inside of the PCB board). In some aspect, an operating current of less than 1 Ampere can be used.

Figure 3A:
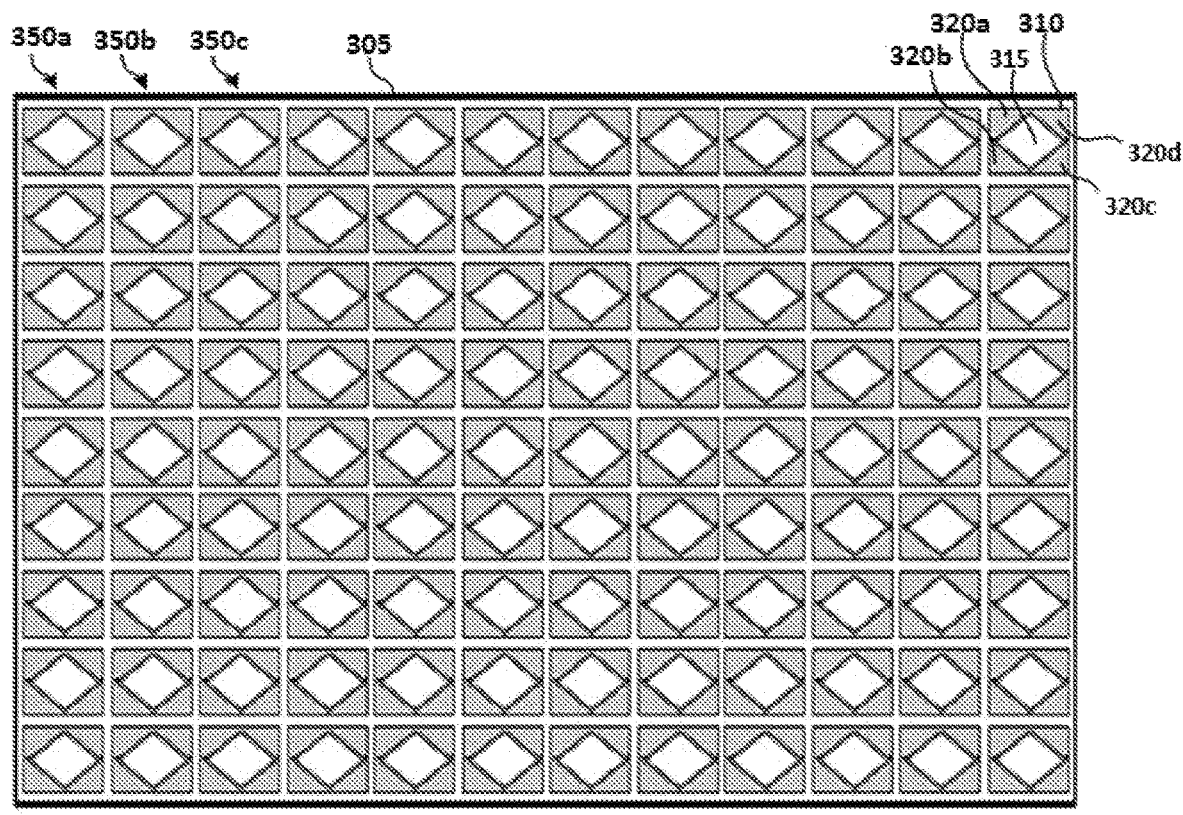
FIGS. 3A-3B illustrate examples of open-well magnetic sample plates according to some aspects disclosed herein.

FIG. 3A illustrates an example of an open-well magnetic sample plate according to some aspects disclosed herein. As shown in FIG. 3A, a 96-well sample plate 305 can include a plurality of sample wells 315. Although diamond-shaped sample wells 315 are depicted in FIG. 3A, the sample wells 315 can have any suitable shape. For example, the sample wells can be square-shaped, rectangular-shaped, round, elliptical, or any other shape capable of operating according to various aspects of the present teachings.

Each sample well 315 can be surrounded about its periphery by a magnetic structure 310 that includes a plurality of electromagnets 320a-d, such as the electromagnets described in connection with FIGS. 2A-2F. The magnetic structures 310 and the methods of mixing magnetic particles using AC-driven oscillating magnetic fields according to various aspects of the applicant's teachings can be incorporated into existing sample plate devices, including sample plate devices configured as large, open arrays of sample wells 315. For example, the magnetic structures 310 can be configured to receive standard sample plate devices, such as industry standard 96-sample well arrays 305. This can be achieved, for instance, by using electromagnets 320a-d and magnetic structure 310 formations having a geometry that corresponds with standard sample well plates. In this manner, fluidic channels and pumps are not required, reducing and even eliminating fluid processing issues relating with these elements, including, without limitation, non-specific binding and carryover (i.e., use of disposable sample plate). In addition, the use of open-well sample systems provides for more efficient methods for sample loading and collection, such as integration with an auto-sampler and other automated fluid-handling systems. In this manner, fluid processing systems according to various aspects of the applicant's teachings may allow for the simultaneous processing of large arrays of samples that is simple and efficient from a fluid manipulation and a mechanical complexity perspective.

Additionally or alternatively, various reagents, magnetic particles, and/or other process elements can be incorporated into the sample wells 315 of the sample plate 305 in order to perform a full assay with reduced sample manipulation. For example, sample wells 315 in each row or column of the sample plate can include process elements required for a particular assay in order of required use. In an example involving a protein processing assay, pull-down beads can be disposed within a first column of sample wells 350a, ion-exchange beads can be disposed within a second column of sample wells 350b, and trypsin-coated beads can be disposed within a third column of sample wells 350c. In this manner, processing of the sample can only require transferring the sample from one column (e.g., column 350a) to another column (e.g., column 350b) to perform the protein processing assay and actuating the electromagnets surrounding each well appropriately in order to facilitate the processing step performed therein.

Figure 3B:
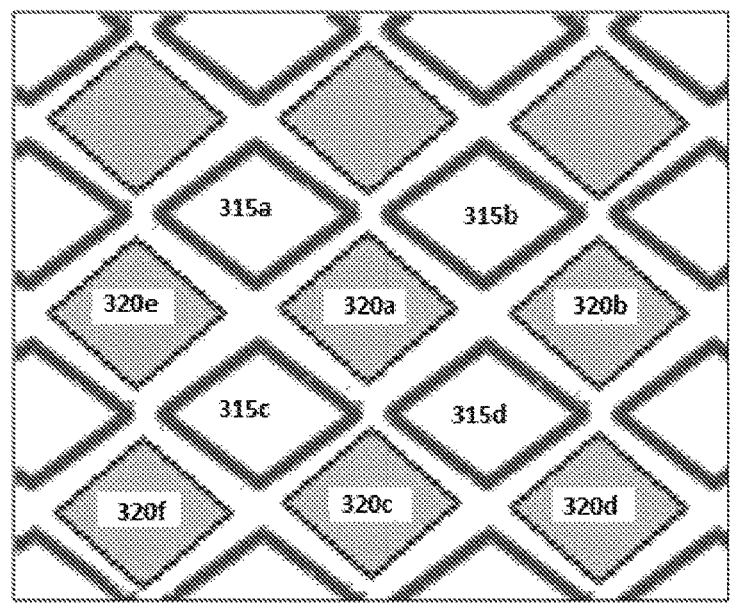

Though the fluid chambers of the sample wells 315 of FIGS. 3A and 3B are depicted as being fluidly-isolated, it will also be appreciated that the sample plate 305 can additionally include various liquid handling elements, including fluidic channels, valves, pumps, or the like, to facilitate fluid movement between the various sample wells 315. For example, one or more pneumatic-controlled pressure manifolds can be integrated onto the sample plate 305 to automatically transfer fluid between the sample wells 315, between a reagent filling port and reagent reservoirs, and/or between reagent reservoirs and the sample wells without requiring moving parts.

Further, each electromagnet 320a-d can be associated with more than one sample well 315 so as to generate a magnetic field within more than one sample well 315. As depicted in FIG. 3B, electromagnet 320a can generate a magnetic field within each of sample wells 315a-d. Accordingly, electromagnet 320a can form an electromagnetic structure 310 with respect to sample well 315d with electromagnets 320b-d. In addition, electromagnet 320a can form an electromagnetic structure 310 with respect to sample well 315c with electromagnets 320c, 320e, and 320f. In this manner, each electromagnet 320a-f can be configured to influence the magnetic particles arranged within multiple sample wells 315a-d. Accordingly, fewer electromagnets 320a-f can be used to actuate magnetic particles within a tray of sample wells 315a-d. For example, only 117 electromagnets 320a-f can be required for a 96-well sample plate, compared with 384 electromagnets (96×4) for a 96-well sample tray using four electromagnets for each sample well 315a-d. Extraction of an entire sample plate can be achieved by actuating alternative rows of electromagnets 320a-f in sequence, with a processing time on the order of a few seconds to complete the extraction process for the entire sample plate.

Figure 4:
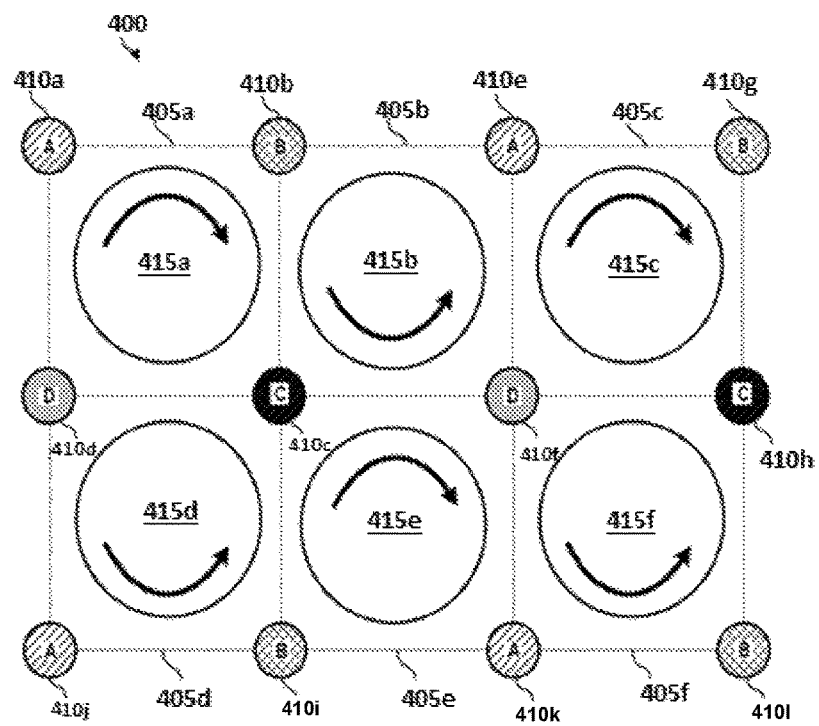
FIG. 4 depicts an illustrative fluid processing system according to some aspects disclosed herein.

FIG. 4 schematically illustrates an illustrative fluid processing system according to various aspects described herein. As shown in FIG. 4, the fluid processing system 400 can include a plurality of magnetic structures 405a-f configured to generate a magnetic field gradient within associated fluid containers 415a-f. Each magnetic structure 405a-f can include a plurality of electromagnets 410a-1, with certain of the electromagnets 410a-1 being shared among the magnetic structures 405a-f. The electromagnets 410a-1 can be controlled via the application thereto of RF signals having different phase delays, such as the following example phase delay equations 420:

$$I_A = I_0 \sin(\text{ft}) \qquad \text{eq. (1)}$$

$$I_B = I_0 \sin\left(\text{ft} + \frac{\pi}{2}\right) \qquad \text{eq. (2)}$$

$$I_C = I_0 \sin(\text{ft} + \pi) \qquad \text{eq. (3)}$$

$$I_D = I_0 \sin\left(\text{ft} + \frac{3\pi}{2}\right) \qquad \text{eq. (4)}$$

wherein $I_\square$ denotes electrical current, f denotes frequency, and t denotes time.

As shown in FIG. 4, the electromagnets 410a, ..., 410l are labeled A-D according to the phase delay equation 420 corresponding to the electromagnet. The phase delay of the electromagnets 410a-1 of the magnetic structures 405a-f produces a 90° phase shift for adjacent electromagnets. However, embodiments are not so limited, as other phase shift values may be used according to various aspects of the applicant's teachings, such as a 180° phase delay, a 270° phase delay, or the like. In various aspects, the actuation of the electromagnets 410a-1 according to the phase delay equations 420 causes the magnetic particles (not shown) in sample wells 415a, 415e, and 415c to mix in a clockwise motion and the magnetic particles in sample wells 415b, 415d, and 415f to mix in a counter-clockwise motion. Mixing fluids using magnetic particles agitated according to various aspects of the applicant's teachings causes the magnetic particles to be dispersed homogeneously within each fluid container, providing for optimal exposure and enhanced mixing with the fluid.

Figure 5:
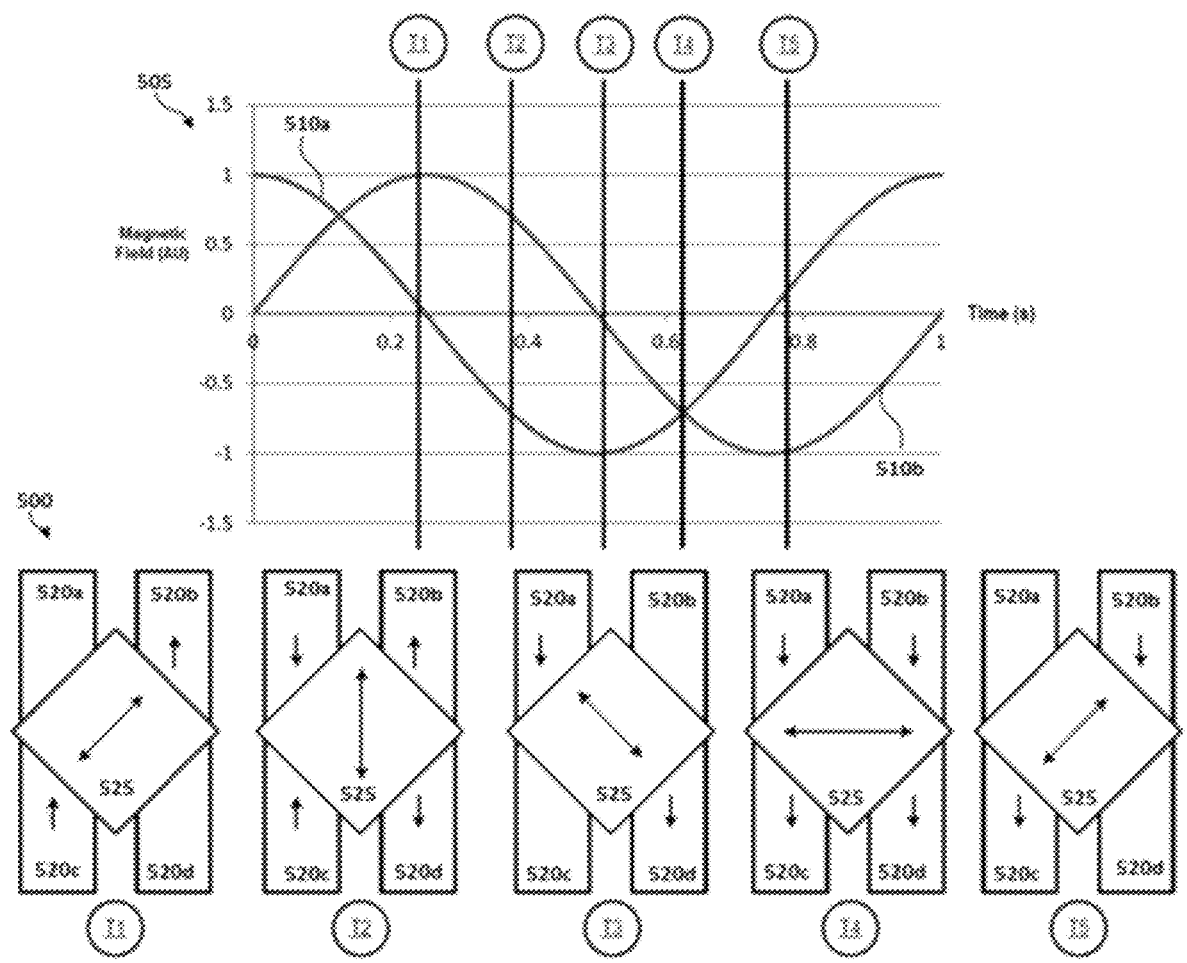
FIG. 5 depicts an illustrative fluid processing structure and mixing pattern thereof according to some aspects disclosed herein.

FIG. 5 depicts an illustrative fluid processing structure and mixing pattern thereof according to various aspects of the applicant's teachings. The graph 505 depicts the magnetic fields 510a, 510b resulting from the application of electric current to the electromagnets 520a-d of a fluid processing structure 500 at time intervals T1-T5 according to various aspects of applicant's teachings. In various aspects, the waveforms of the magnetic fields 510a, 510b represent sine waves which generate the example schematic movement 525 of the magnetic particles within the container to facilitate continuous magnetic particle mixing and improved mixing efficiency. The magnetic fields 510a, 510b have a 90° phase shift relative to one another, with the magnetic field 510a corresponding to electromagnets 520a and 520d and magnetic field 510b corresponding to electromagnets 520b and 520c.

In the illustrative depiction of FIG. 5, it will be appreciated that the electromagnets 520a-d are arranged at different locations relative to the fluid sample such that the orientation of the magnetic field generated by each electromagnet generally differs when the same electrical signal is applied thereto. Likewise, because the electromagnetic pairs (i.e., 520a and 520d, and 520b and 520c) are arranged on opposed sides of the fluid sample, the magnetic field generated by the electrode in each pair is in the same direction when an electrical signal of the same magnitude and of opposite phase are applied to the electromagnet in each pair. Thus, when the sinusoidal electrical signals of eq. (1)-(4) are applied to electromagnets 520a-d, respectively, the resulting magnetic field in the sample fluid can vary over time as schematically depicted in FIG. 5, with the pair of electromagnets 520a and 520d together generating the magnetic field 510a and the pair of electromagnets 520b and 520c together generating the magnetic field 510b (magnetic field 510b is delayed 90° relative to magnetic field 510a), thereby causing the fluid to experience mixing in a generally counter-clockwise manner due to the movement 525 of the particles at the various time points as schematically depicted. Therefore, different mixing patterns can be effectuated by controlling the AC waveforms applied to the electromagnets of a magnetic structure.

The magnetic structures and fluid processing systems described in accordance with the applicant's present teachings can be used in combination with various analysis equipment known in the art and hereafter developed and modified in accordance with the present teachings, such as an LC, CE, or MS device.

Figure 6:
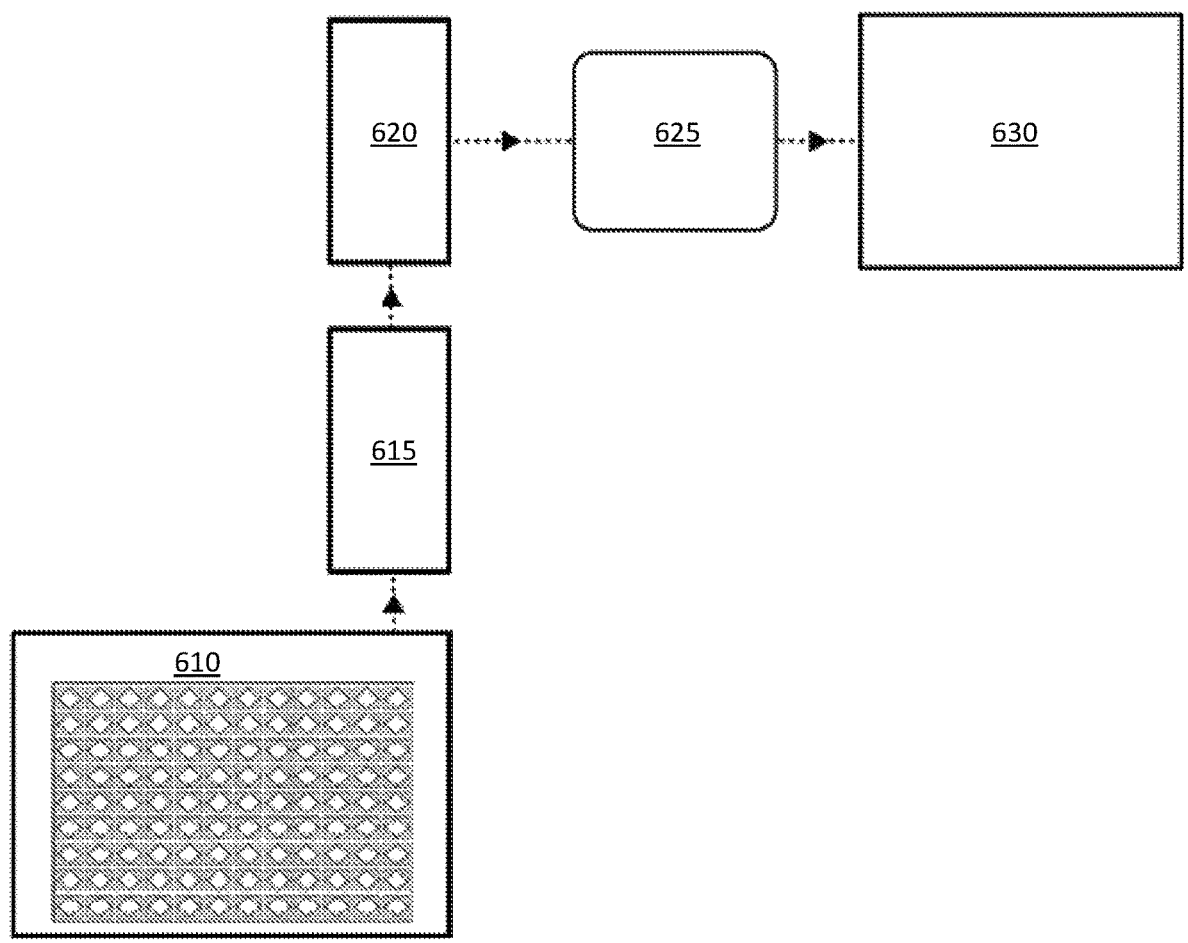
FIG. 6 depicts an illustrative fluid processing and analysis system according to some aspects disclosed herein.

With reference now to FIG. 6, one illustrative fluid processing and analysis system according to various aspects of the applicant's teachings is schematically depicted. As shown in FIG. 6, a fluid processing system 610 can be configured to process fluid samples using magnetic structures and an open-well sample plate in accordance with some embodiments. The processed fluid can be collected from the fluid processing system 610 using any of a manual sample loading device (e.g., pipette, a multi-channel pipette) or various automated systems such as a liquid handling robot, an auto-sampler, or an acoustic liquid handling device (e.g., Echo® 525 liquid handler manufactured by LabCyte, Inc. of Sunnyvale, California), all by way of non-limiting example.

The processed fluid can be transferred using various fluid transfer devices, such as a vortex-driven sample transfer device. As noted above, the sample removed from one sample well can be added to a different sample well on the plate for further processing steps or can be delivered to the downstream analyzer. For example, in some aspects, the processed sample can be delivered to an LC column 615 for in-line LC separation, with the eluate being delivered to the ion source 620 for ionization of the processed analytes, which can be subsequently analyzed by a DMS 625 that analyzes the ions based on their mobility through a carrier gas and/or a mass spectrometer 630 that analyzes the ions based on their m/z ratio. In some aspects, processed samples can be transferred directly to an ion source 615, with separation being provided by a differential mobility spectrometer (DMS) assembly, for example, in-line with a MS as described in U.S. Pat. No. 8,217,344, the entire teachings of which is incorporated by reference herein. Fluid processing systems described in accordance with the applicant's present teachings in combination with a DMS assembly for chemical separation may eliminate the need for a LC (or HPLC) column for processing samples for MS analysis. In various aspects, processed samples may be introduced into analytical equipment, such as an MS, using a surface acoustic wave nebulization (SAWN) apparatus, an electrospray ionization (ESI) device, and a matrix assisted inlet ionization (MAII) source.

Although this specification discloses advantages in the context of certain illustrative, non-limiting embodiments, various changes, substitutions, permutations, and alterations may be made without departing from the scope of the specification as defined by the appended claims. Further, any feature described in connection with any one embodiment may also be applicable to any other embodiment.

What is claimed is:

1. A fluid processing system comprising:
    a plurality of fluid containers, each fluid container being configured to define a fluid chamber configured to contain a fluid and a plurality of magnetic particles therein, the fluid chamber being configured to extend from a closed lower end to an open upper end that is open to atmosphere and configured to receive the fluid for processing using the fluid processing system;
    a plurality of electromagnets, each electromagnet being configured to generate an electromagnetic field within at least one of the plurality of the fluid containers, each electromagnet comprising a plurality of spring loaded connections;
    a PCB board comprising a plurality of electrical contact terminals, each electrical contact terminal being configured to receive an electrical signal from an electrical power source, each electrical contact terminal further being configured to connect to a spring loaded connection of a corresponding electromagnet and establish an electrical connection with the corresponding electromagnet that supplies the corresponding electromagnet with the electrical signal; and
    a control component coupled to the plurality of electromagnets, the control component being configured to control the electromagnetic field generated by each electromagnet to generate a plurality of magnetic field gradients within the at least one fluid container sufficient to magnetically influence the plurality of magnetic particles within the fluid in each fluid container.

2. The fluid processing system of claim 1, wherein the PCB board further comprises a plurality of holes, and wherein each hole is configured to receive at least a portion of an electromagnet.

3. The fluid processing system of claim 2, wherein at least two electrical contact terminals are disposed adjacent to a circumference of each hole.

4. The fluid processing system of claim 2, wherein each electromagnet comprises a mounting post configured for insertion into a corresponding hole.

5. The fluid processing system of claim 1, wherein the plurality of electrical contact terminals comprise electrical wires that are connected to the PCB board.

6. The fluid processing system of claim 1, wherein at least one of the plurality of electromagnets comprises one or more magnetic lenses configured to reshape the electromagnetic field generated by the at least one of the plurality of electromagnets.

7. The fluid processing system of claim 1, wherein the plurality of spring loaded connections comprise at least one spring loaded push pin.

8. The fluid processing system of claim 1, wherein each electromagnet comprises a coiled conductive wire and wherein spring loaded connections of each electromagnet are electrically coupled to the coiled conductive wire of that electromagnet.

9. The fluid processing system of claim 1, wherein at least one fluid container comprises a plurality of sample wells arranged within a sample plate.

10. The fluid processing system of claim 9, wherein the sample plate comprises a 96-well sample plate.

11. A method for processing fluids comprising:
    delivering a fluid and a plurality of magnetic particles to a plurality of fluid containers;
        supplying an electrical signal, directed from an electrical power source to a PCB board, through a plurality of electrical contact terminals included in the PCB board, to a plurality of electromagnets by establishing an electrical connection between spring loaded connections included on each electromagnet and the plurality of electrical contact terminals of the PCB board;
    generating an electromagnetic field within at least one of the plurality of the fluid containers using the plurality of electromagnets; and
    controlling the electromagnetic field generated by each electromagnet to generate a plurality of magnetic field gradients within the at least one fluid container sufficient to magnetically influence the plurality of magnetic particles within the fluid in each fluid container.

12. The method of claim 11, wherein the PCB board further comprises a plurality of holes, and further comprising establishing a connection between each electromagnet and the PCB board by inserting at least a portion of an electromagnet into a corresponding hole.

13. The method of claim 12, further comprising establishing the connection by connecting the spring loaded connections included on an electromagnet to electrical contact terminals disposed adjacent to a circumference of the corresponding hole.

14. The method of claim 12, further comprising inserting the electromagnet into the corresponding hole using a mounting post of the electromagnet.

15. The method of claim 11, further comprising connecting the plurality electromagnets into the PCB board using one or more wires on the PCB board.

16. The method of claim 11, further comprising reshaping the electromagnetic field generated by each electromagnet using one or more magnetic lenses included in each electromagnet.

* * * * *